Nov. 10, 1959 C. C. CUTLER 2,912,695

CORRUGATED WAVE GUIDE DEVICES

Original Filed Dec. 31, 1948 9 Sheets-Sheet 1

INVENTOR
C. C. CUTLER
BY Hugh S. Wertz
ATTORNEY

Nov. 10, 1959 C. C. CUTLER 2,912,695

CORRUGATED WAVE GUIDE DEVICES

Original Filed Dec. 31, 1948 9 Sheets-Sheet 2

LEM MODE

TM MODE

→z FIRST TM MODE $\frac{l}{\lambda} < \frac{1}{4}$

TM MODE $\frac{l}{\lambda} > \frac{1}{4}$

SECOND TM MODE $\frac{l}{\lambda} < \frac{1}{4}$

TM MODE $\frac{l}{\lambda} > \frac{1}{4}$

SECOND LEM MODE $\frac{l}{\lambda} < \frac{1}{4}$

INVENTOR
C. C. CUTLER
BY Hugh S. Wertz
ATTORNEY

Nov. 10, 1959 C. C. CUTLER 2,912,695

CORRUGATED WAVE GUIDE DEVICES

Original Filed Dec. 31, 1948 9 Sheets-Sheet 3

INVENTOR
C. C. CUTLER
BY Hugh S. Wertz
ATTORNEY

CORRUGATED WAVE GUIDE DEVICES

Original Filed Dec. 31, 1948 9 Sheets-Sheet 4

INVENTOR
C. C. CUTLER
BY Hugh S. Wertz
ATTORNEY

INVENTOR
C. C. CUTLER
BY Hugh S. Wertz
ATTORNEY

Nov. 10, 1959 C. C. CUTLER 2,912,695

CORRUGATED WAVE GUIDE DEVICES

Original Filed Dec. 31, 1948 9 Sheets-Sheet 6

INVENTOR
C. C. CUTLER
BY Hugh S. Wertz
ATTORNEY

Nov. 10, 1959 C. C. CUTLER 2,912,695

CORRUGATED WAVE GUIDE DEVICES

Original Filed Dec. 31, 1948 9 Sheets-Sheet 7

INVENTOR
C. C. CUTLER
BY Hugh S. Wertz
ATTORNEY

PERPENDICULAR POLARIZATION

INVENTOR
C. C. CUTLER
BY Hugh S. Wertz
ATTORNEY

INVENTOR
C. C. CUTLER
BY Hugh S. Wertz
ATTORNEY 2,912,695

CORRUGATED WAVE GUIDE DEVICES

Cassius C. Cutler, Gillette, N.J., assignor to Bell Telephone Laboratories, Incorporated, New York, N.Y., a corporation of New York Original application December 31, 1948, Serial No. 68,549, now Patent No. 2,659,817, dated November 17, 1953. Divided and this application September 30, 1953, Serial No. 383,268

2 Claims. (Cl. 343—781)

This invention relates to electromagnetic wave guides and wave guide systems. This application is a division of copending application Serial No. 68,549, filed December 31, 1948, now Patent 2,659,817, November 17, 1953.

Objects of the invention include electromagnetic wave transmission and reception, wave delay and phase control, frequency filtering, mode conversion, mode discrimination and suppression, radiation and radiation pattern control, and control of the interaction between electronic streams and electromagnetic waves.

It has been discovered that corrugated metallic surfaces are able to provide new types of electromagnetic propagation in a direction perpendicular to the guiding corrugations. These types differ from electromagnetic waves in free space, or near smooth conducting surfaces, in that their energy is contained in a region very close to the surface, with the field strength decreasing exponentially away from it. Wave energy follows such corrugated surfaces closely, even if they are bent or warped. The electromagnetic waves in this case are truly "guided" waves even though not necessarily fully confined within physical boundaries. Also, such waves may have a longitudinal component of electromagnetic field in the direction of propagation, similar to that of the more conventional waves propagating over known forms of wave guides. However, they differ essentially from the conventional guided waves in that the velocity and impedance associated therewith depend on the corrugated contour of the guiding surface, the velocity being in general slower than that in free space.

As an aid in understanding the operation of some embodiments of the invention, two general conductive surface conditions are disclosed, namely, (1) where the slots or corrugations are less than one-quarter wavelength deep $$+n\frac{\lambda}{2}$$

and (2), where they are between one-quarter and one-half wavelength deep $$+n\frac{\lambda}{2}$$

where $n$ is an integer 0, 1, 2, 3 etc. and $\lambda$ is the free space wavelength.

In the first case, which may be termed an "inductive" surface, the lowest order mode is propagated with velocities ranging from zero to infinity, depending on how the wave is confined. The external waves exist and are propagated at a velocity slower than in free space. In the second case, which might be called a "capacitive" surface, the waves are not guided unless fully confined, whereupon they will propagate with velocities greater than that of free space and with properties similar to conventional guided waves. In both cases, the higher order modes are always transmitted with velocities greater than that of free space or of the dielectric medium or filling associated with the corrugated conductor systems.

In this specification, the TM mode or transverse magnetic mode is characterized by having no longitudinal component of magnetic force, whereas the longitudinal electromagnetic LEM mode has longitudinal electric and magnetic field components and may also be referred to as "hybrid waves" as in S. A. Schelkunoff's book "Electro-Magnetic Waves," published in 1943 in New York by Van Nostrand Company.

Referring to the figures of the drawing.

Figure 12:
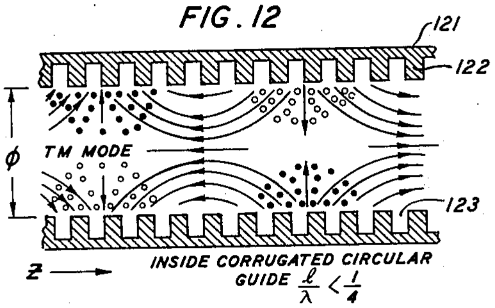
Figure 13:
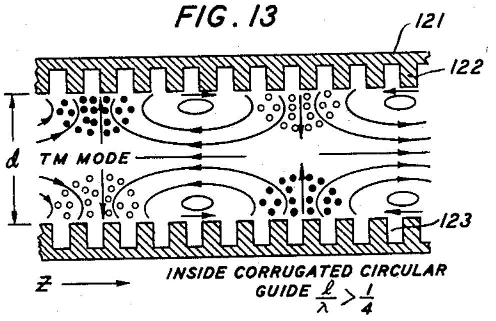
Figure 14:
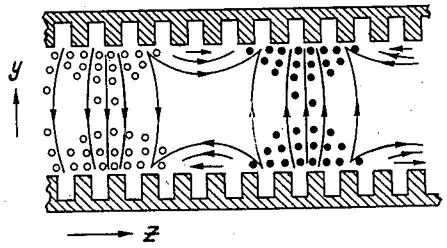
Figure 22:
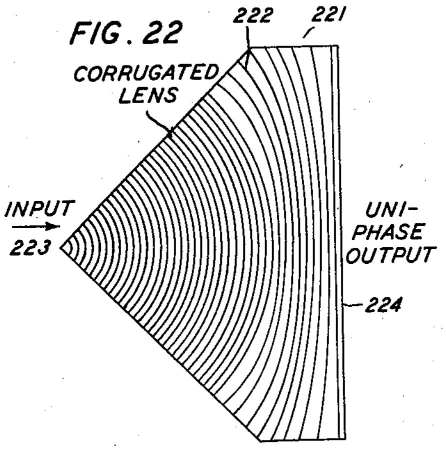
Figure 18:
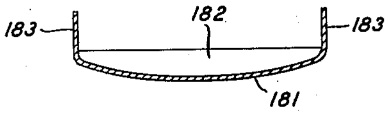
Figure 15:
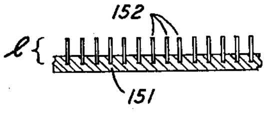
Figure 16:
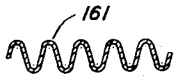
Figure 17:
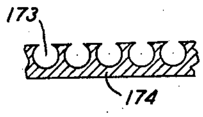
Figure 23:
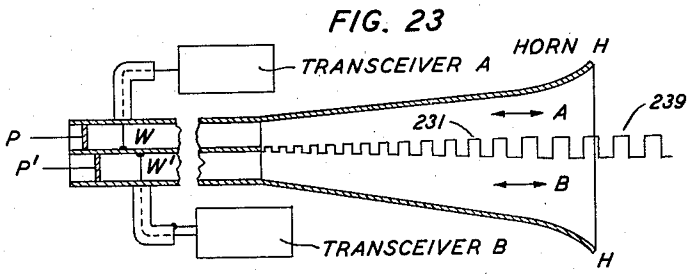
Figure 24:
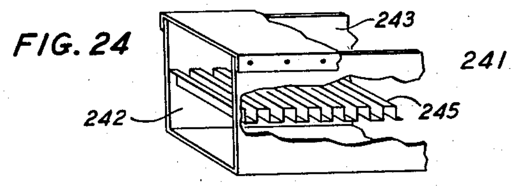
Figure 26:
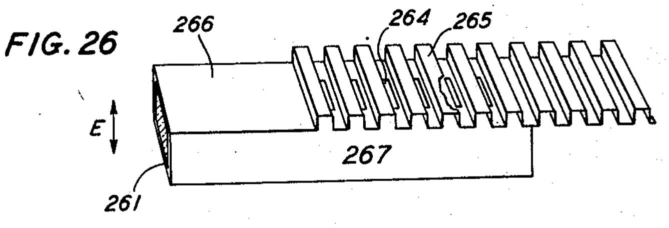
Figure 27:
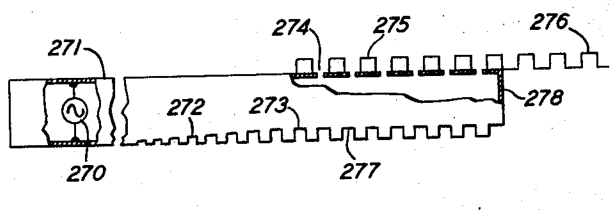
Figure 28:
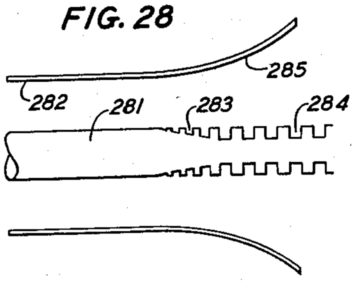
Figure 29:
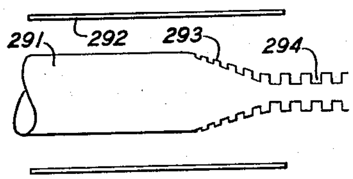
Figure 30:
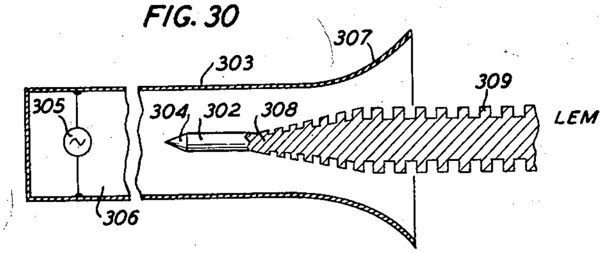
Figure 31:
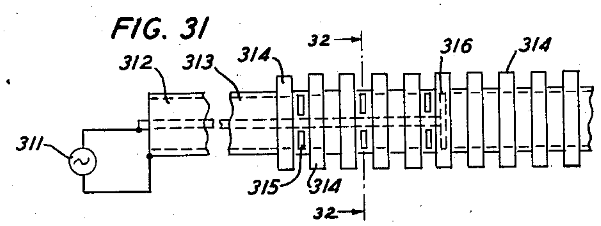
Figure 32:
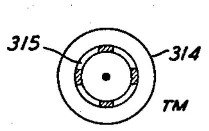
Figure 33:
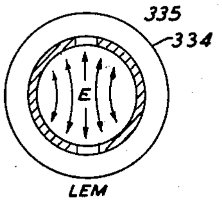
Figure 34:
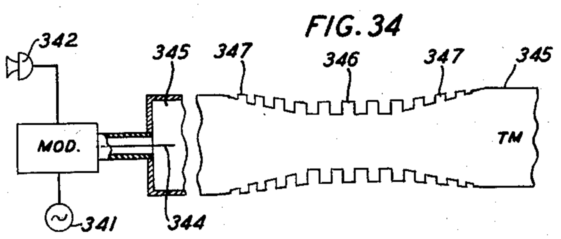
Figure 35:
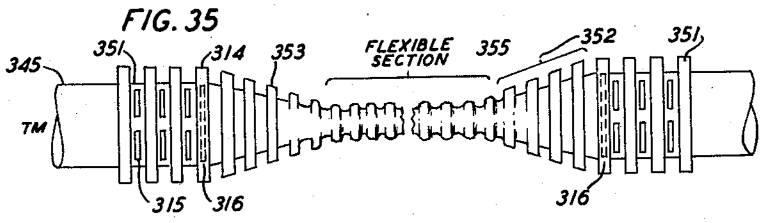
Figure 36:
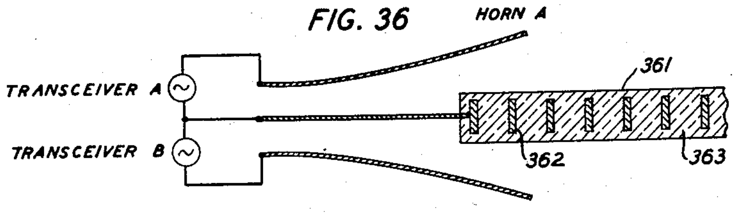
Figure 37:
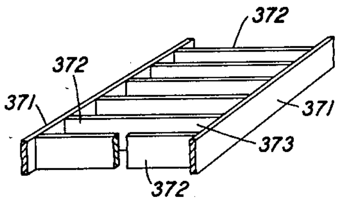
Figure 38:
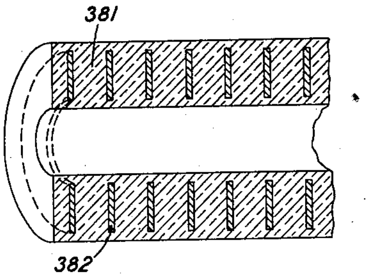
Figure 39:
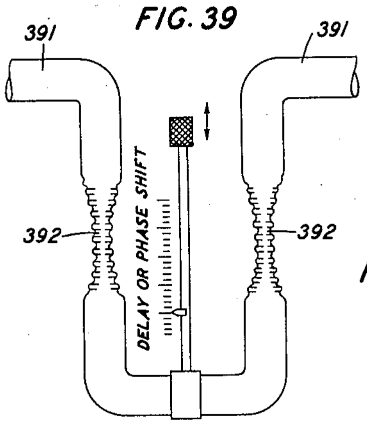
Figure 40:
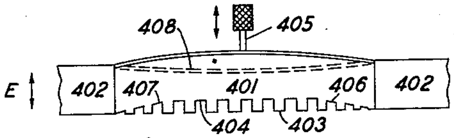
Figure 41:
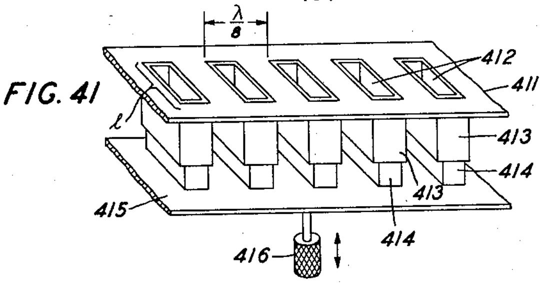
Figure 42:
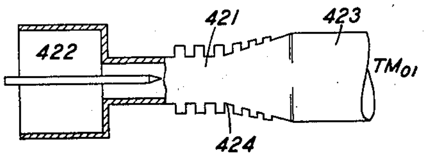
Figure 43:
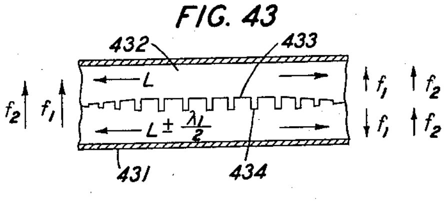
Figure 44:
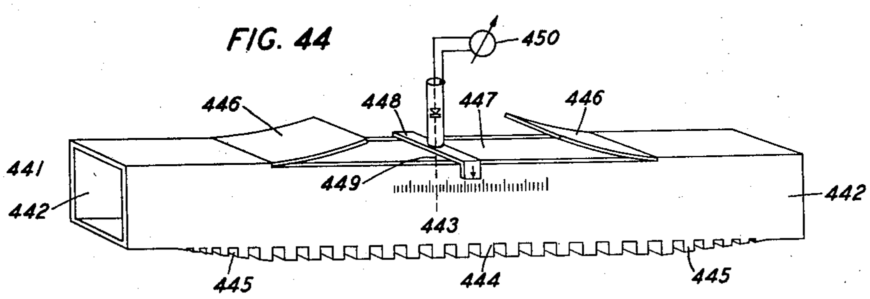
Figures 45, 46, 47, 48:
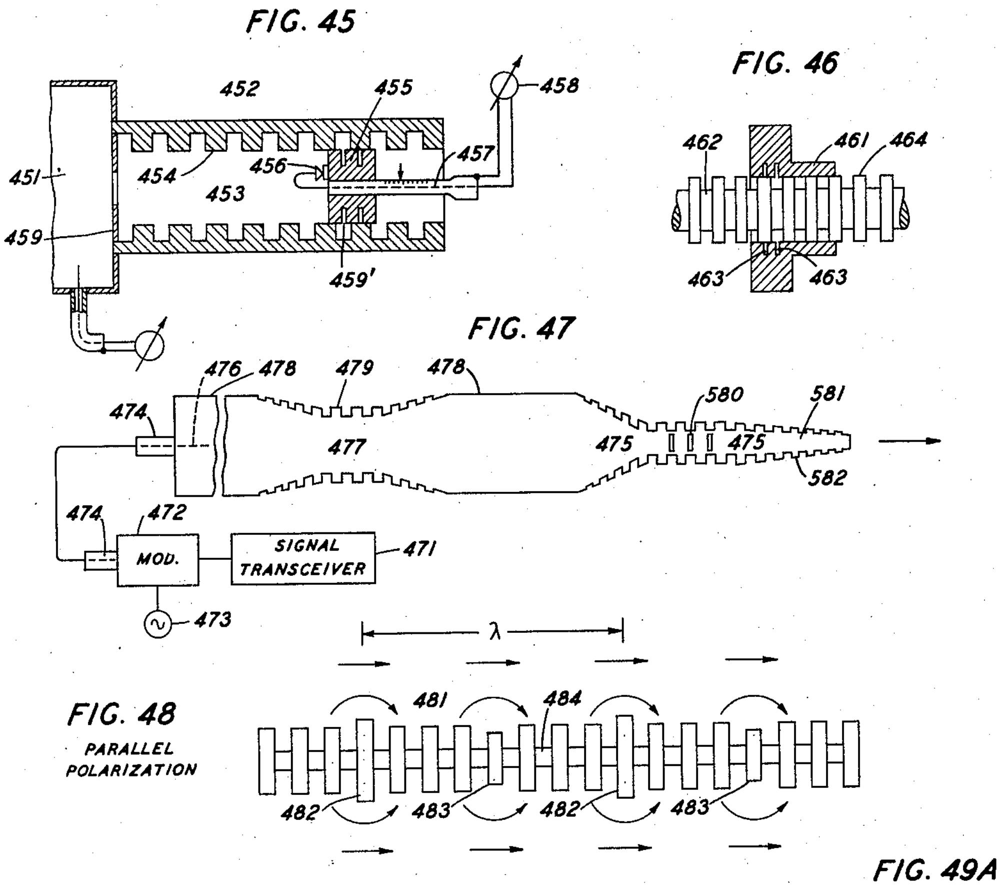
Figure 49:
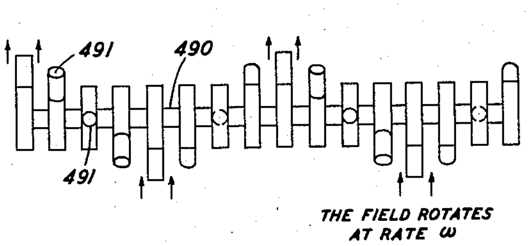
Figure 49A:
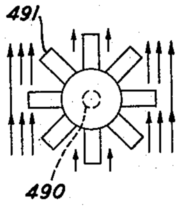
Figure 50:
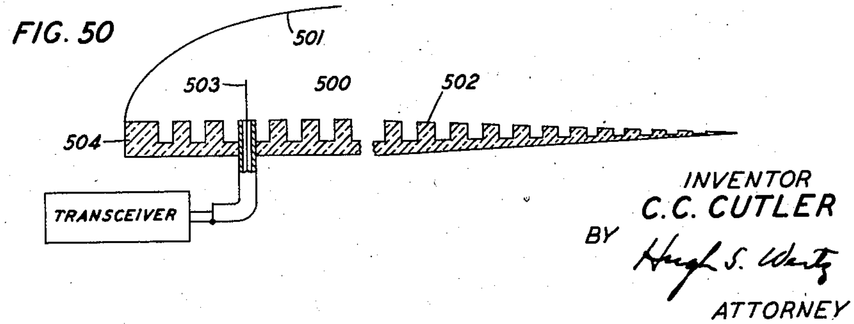
Figure 51B:
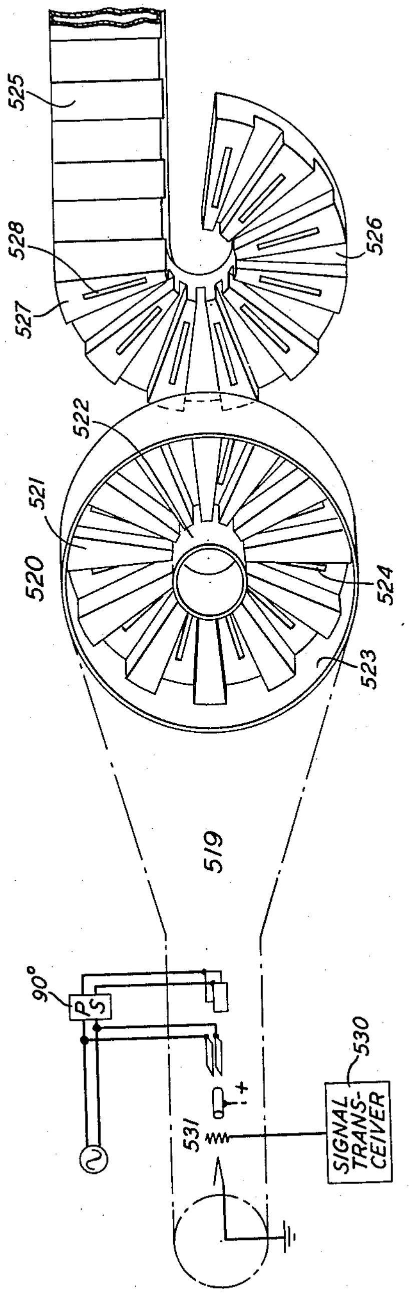
Figure 51B:
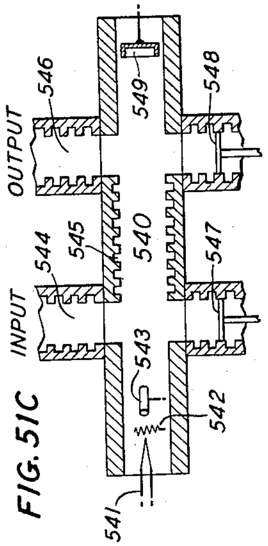
Figure 51A:
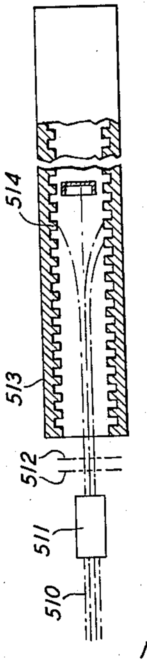

Figs. 6 to 9 inclusive show spaced corrugated conductive planar sheets for guiding waves of TM mode;

Figs. 10, 10A, 11 and 11A show hollow rectangular wave guides with internal corrugations;

Figs. 10B, 10C, 11B, 11C show explanatory diagrams;

Figs. 12, 13 and 14 show hollow cylindrical wave guides with internal corrugations;

Figs. 12A, 12B, 13A, 13B, 14A, 14B show explanatory diagrams;

Figs. 15, 16, 17 show various illustrative modifications of fabricated corrugated surfaces;

Fig. 18 shows a trough-shaped corrugated surface;

Figs. 19, 20, 21, 23, 25 show various modifications of radio transmission and reception systems involving corrugated surfaces;

Fig. 22 shows a corrugated surface lens for radio use;

Fig. 24 shows a modified rectangular corrugated wave guide;

Figs. 26, 27 show wave guide radiating structures for converting from interior to exterior wave propagation along corrugated surfaces;

Figs. 28, 29 show coaxial cables having inner corrugated conductors;

Fig. 30 shows similar mode converters involving corrugated guides utilized in a communication system;

Fig. 31 shows corrugated wave guides for providing a transition between interior and exterior wave propagation;

Figs. 32, 33 are cross sections of the transition showing exit slots for TM and LEM mode propagation respectively;

Figs. 34, 35 show a transmission signaling system utilizing propagation over the interior and exterior of hollow corrugated pipes;

Fig. 36 is a modification of the signaling system shown in Fig. 23;

Figs. 37, 38, 41 show variants of corrugated wave guides;

Figs. 39, 40 show corrugated guide phase shifters;

Fig. 42 shows a corrugated guide mode converter;

Fig. 43 shows a corrugated guide filter;

Fig. 44 shows a standing wave detector;

Fig. 45 shows a corrugated guide wavemeter;

Fig. 46 shows a reflecting piston on a corrugated rod;

Figs. 47, 50 show signaling systems;

Figs. 48, 49 and 49A illustrate antenna arrays involving corrugated wave guide structure;

Figs. 51A, 51B, 51C show electron tubes involving corrugated wave guide construction.

(I) *Single corrugated planar surface*

Figure 1:
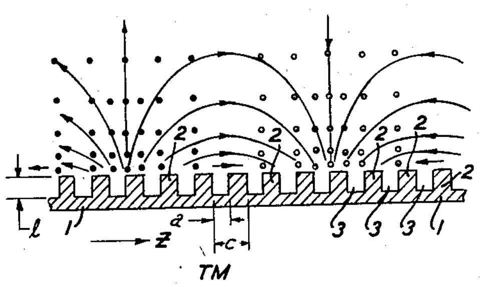
Fig. 1 shows a corrugated planar surface for guiding electromagnetic waves.

Referring to Fig. 1 of the drawing, 1 represents an extended conductive surface which may be planar as shown or curved, and has thereon a series of transverse rectangular corrugations 2, uniformly spaced and separated by notches or slots 3. The slot width $a$ is generally a small fraction of a wavelength, for example $$\left(\frac{\lambda}{8} > a\right)$$

while the ratio $$\frac{\text{depth } l}{\frac{1}{4}\lambda}$$

constitutes an important parameter in determining the propagational characteristics of the corrugated surface. The series of regularly spaced corrugations 2 may cover the entire longitudinal extent of the planar surface 1, each corrugation being of uniform thickness $t$ represented by $t=(c-a)$ as shown in Fig. 1 or alternatively, the corrugations may extend only over a portion of the surface 1.

When the depth $l$ of the corrugation is less than a quarter wavelength in free space, i.e.

$$l < \frac{\lambda}{4}$$

the corrugated surface may be termed "inductive," because the input impedance across each slot is inductive and the storage of field is predominantly magnetic. A traveling surface wave exists, which propagates along the direction Z and is guided by the corrugated surface 1 with a velocity $v$, dependent on $l$, the corrugation depth, and varying from free-space velocity at zero depth, to zero velocity at one-quarter wavelength depth. The impedance (E/H) of the wave varies inversely from free-space impedance characterized by a smooth surface and $l=0$, to infinite impedance for a quarter-wave depth of corrugation 2. The variation of field strength away from the corrugated surface 1 changes from a very slow exponential decrease with a shallow slot to a very fast exponential decrease as the slot depth approaches one-quarter wavelength.

Figures 1A, 1B:
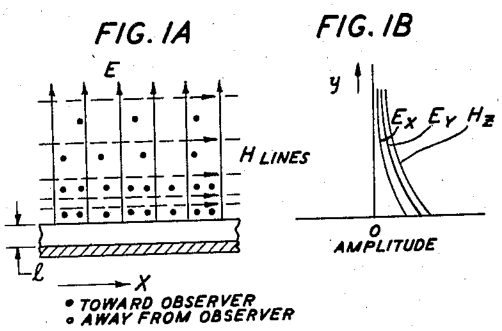
Figs. 1A and 1B are explanatory diagrams associated with Fig. 1.

The lines of force for a transverse magnetic TM wave are shown in Fig. 1A—the solid lines representing electric force E and the dotted lines perpendicular thereto, the magnetic force H.

Fig. 1B shows the amplitude of the field components as a function of the perpendicular distance above the corrugated planar surface 1.

There is a longitudinal component $E_Z$ of the electric field in the direction of propagation Z. After a certain distance all components of the electromagnetic field $E_X$, $E_Y$, $E_Z$ diminish rapidly with distance from the corrugated surface so that the flow of energy is effectively confined to the immediate vicinity of the corrugated guiding surface 2. It is found that the waves still adhere to the surface even when it is curved or warped. The phase velocity and wavelength are less than those of a wave of the same frequency guided by a smooth planar conductive surface. The corrugated surface also has "inductive" characteristics when $\frac{1}{2}\lambda < l < \frac{3}{4}\lambda$, or more generally when $$n\frac{\lambda}{2} < l < \frac{\lambda}{4} + n\frac{\lambda}{2}$$

When the depth of the corrugation $l > \frac{1}{4}\lambda$, the corrugated surface is designated as "a capacitive surface." Here the variation of field with distance from the corrugated surface changes from the large negative exponential characteristic $l^{-r}$ of the "inductive" surface to the large positive exponential $l^{+r}$. In this case, the field increases indefinitely away from the surface, so that the wave is no longer "guided." Instead, a plane wave near the surface tends to be slowed, and will be transmitted parallel to the surface with a field decreasing toward the surface, the rate of decrease being greater, the nearer the corrugations are to one-quarter wavelength in depth. In other words, the surface is unable to guide a wave and the flow of power is directed into the space above the corrugation instead of being confined to the vicinity of the surface. When $$l = \frac{1}{4}\lambda$$

the oscillations in adjacent slots are in opposite phase and a complete standing wave will exist on the corrugated surface. The wavelength of this standing wave is twice the distance between the mid-portions of adjacent slots 3, 3.

*(II) Single corrugated rod*

Figure 2:
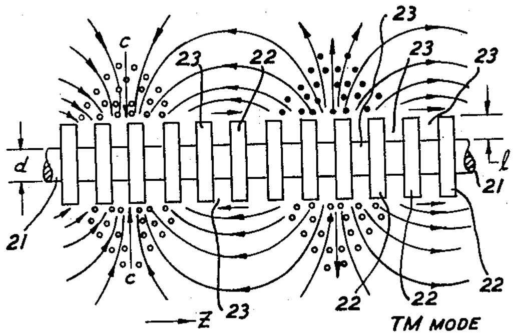
Fig. 2 shows a corrugated solid rod for guiding TM or transverse magnetic mode electromagnetic waves.

Fig. 2 shows a long corrugated circular rod 21 propagating a transverse magnetic mode TM. The exterior surface of the rod has transverse discs or corrugations 22, uniformly spaced by slots 23, which may be a small fraction of a wavelength wide.

Figure 2A:
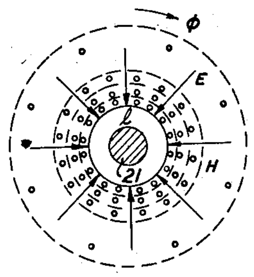
Figs. 2A and 2B are associated explanatory diagrams.
Figure 2B:
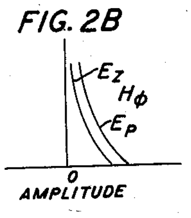

Fig. 2A shows the electric (E) and magnetic (H) lines of force for a transverse magnetic mode TM on the corrugated rod, whereas Fig. 2B shows the amplitude of the field components $E_Z$, $E_0$ as a function of the radial distance from the rod's axis.

As is apparent by comparison of the field patterns of Figs. 2A and 1A, the transmission of the circularly symmetric TM mode externally of the rod (Fig. 2) is in many respects similar to the transmission along a flat sheet (Fig. 1). In the limiting case of infinitely large diameters for the rod, the transmission would be identical. However, when the rod diameter is made very small a faster transmission is associated with the rod, which, however, never exceeds the free-space velocity. The TM mode may be excited by connecting the corrugated rod structure 21 to the end of the inner conductor of a coaxial line (not shown) or the like.

Figure 3:
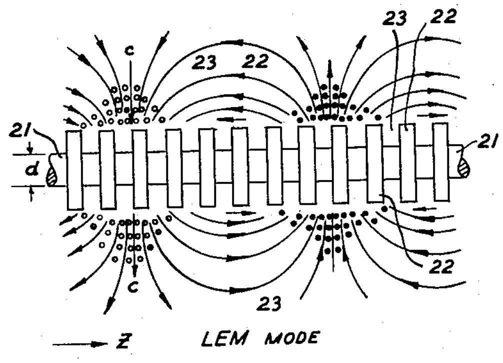
Fig. 3 shows a corrugated solid rod for guiding LEM or longitudinal electromagnetic mode waves.
Figure 3A:
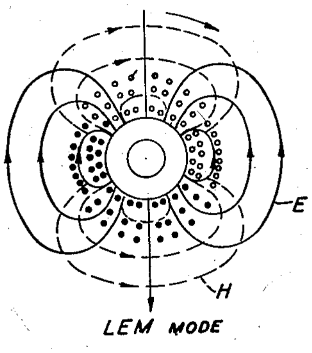
Figs. 3A and 3B show explanatory diagrams.
Figure 3B:
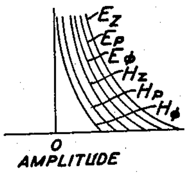

Figs. 3 and 3A show respectively a longitudinal electromagnetic mode (LEM) propagating on the aforementioned corrugated rod 21 and the characteristic field patterns associated therewith. Fig. 3B shows the amplitude of the field components as a function of $\rho$, the radial distance from the rod.

The LEM mode, Fig. 3A, of transmission has similar properties to the TM mode shown in Fig. 2A. It is, however, not circularly symmetric as is the TM mode, but is polarized and travels faster on a given rod. This wave may be excited by placing the end of the corrugated rod 21 in the open end of a rectangular wave guide transmitting its dominant $TE_{10}$ mode or in a smooth cylindrical guide transmitting the $TE_{11}$ mode.

Figure 4:
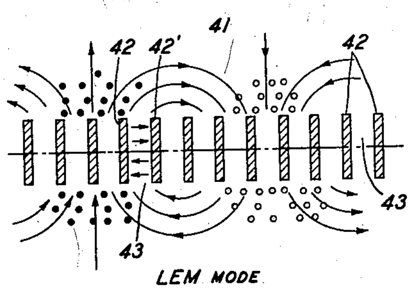
Figs. 4 and 5 show regularly spaced conductive discs for propagating LEM and TM modes, respectively.
Figure 5:
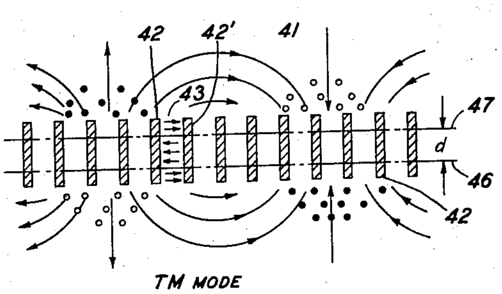

Figs. 4 and 5 show a form of disc transmission line derived from the corrugated rod (Figs. 2 and 3) as a limiting case, namely, when the rod diameter $d$ approaches and becomes equal to zero. Thus, the transmission line 41 of Figs. 4 and 5 comprises a series of parallel, regularly spaced conductive discs 42 of equal diameter, immersed in a dielectric medium 43 which may be fluid or solid. Alternatively, the discs 42 may be spaced apart by dielectric spacers. The spacing of the discs 42 is of the order of one-eighth wavelength, and their thickness is a fraction of the spacing.

Fig. 4 illustrates the propagation of an LEM mode over the disc transmission line 41 as indicated, whereas Fig. 5 depicts the propagation of a TM mode thereon.

With respect to the electromagnetic properties of the disc transmission line 41 of Fig. 4, the propagation of electromagnetic waves thereon is essentially the same as in Fig. 3, with the limiting condition that $d$ becomes very small and approaches zero. For this limiting case, the currents in the rod naturally become very small, approaching zero. A similar distribution of currents is depicted in Fig. 4, where equal and oppositely directed current exists between adjacent plates 42, 42'. The diameter of the disc may be in the range from 0–λ.

With respect to the electromagnetic properties of the disc line 41 shown in Fig. 5, the propagation of TM modes thereon corresponds to the propagation on the corrugated rod of Fig. 2. The parallel plate arrangement 42, 43, 42', which is a resonant disc transmission line, has as its counterpart in Fig. 2, the corrugated rod section 22, 23, 22. The electric current distributions between plates 42, 42' are represented by the short arrows. The external fields and current distributions in Fig. 4 are similar to those of Fig. 2, and the similarity of structures is made even more apparent by the dot-dash representation of an imaginary rod 46, 47 passing through the discs, as illustrated in Fig. 5. The diameter of the discs in Fig. 5 may be the order of ½λ or greater.

*(III) Parallel corrugated sheets*

Figure 6:
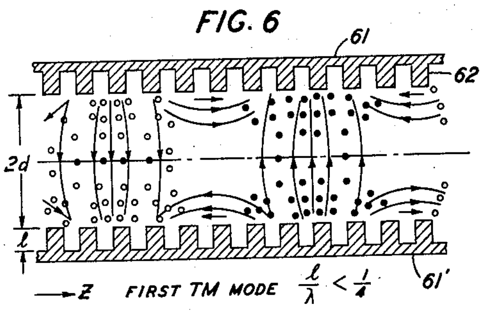
Figure 7:
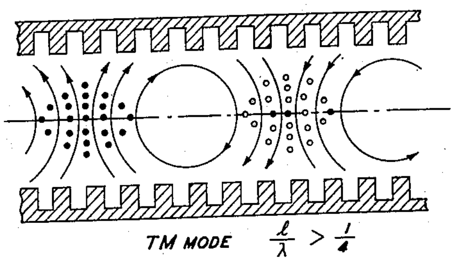
Figure 8:
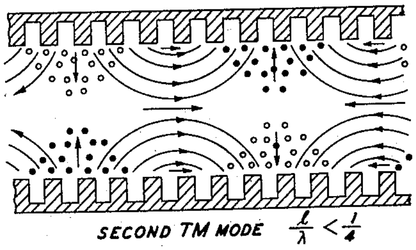
Figure 9:
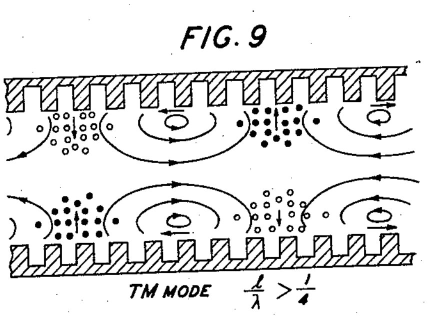

Figs. 6 to 9, inclusive, show two flat, parallel corrugated plates or sheets 61, 61' with their respective corrugations 62, 62' facing each other. The corrugations are structurally like those of Fig. 1. There are two possible modes of propagation for shallow corrugations, both being, namely, the first transverse magnetic TM (Figs. 6 and 7) both of which propagate perpendicular to the slot direction, at slower than free-space velocity. In Fig. 6, the ratio $$\frac{l}{\lambda}<\frac{1}{4}$$

whereas in Fig. 7

$$\frac{l}{\lambda}>\frac{1}{4}$$

However, the velocity dependence upon the spacing of the plates $2d$ is inverse—one increases while the other decreases. Thus, the TM mode shown in Fig. 6 travels more slowly as the spacing $2d$ gets smaller, while the impedance (E/H) rises indefinitely. There is no cut-off spacing $2d^{\infty}$ or cut-off frequency for this mode, and its symmetry is such that it may also be propagated between a single corrugated plate and a smooth conducting plate, with half the plate separation ($d$).

The second TM mode (Fig. 8) propagates with a velocity increasing with smaller spacings, and having a critical cut-off spacing $2d^{\infty}$ and a lower cut-off frequency, depending upon the depth of slot. Since this wave everywhere has a longitudinal component of electric field, it can only propagate between two corrugated plates.

When the slot depth $l$ is greater than one-quarter wavelength, both TM modes (Figs. 7 and 9) are transmitted with velocities always greater than the velocity in free space. The velocity depends upon the slot depth $l$ and the spacing $2d$, being greater for smaller spacings. With a given depth, there will be a spacing $2d^{\infty}$ below which there is no transmission. This limiting spacing $2d^{\infty}$ becomes smaller as the depth approaches one-half wavelength.

When the slot depth $l$ is smaller than one-quarter wavelength, higher order modes may exist. They are similar to those described in the preceding paragraph. As the slot is deepened, the cut-off separation for these modes becomes smaller till the depth reaches one-quarter wavelength and the first modes disappear. At this point the higher order modes become dominant and vary continuously, identical to the previous next lower order modes but with one-half wavelength deeper corrugations.

For shallow slots and fixed boundary conditions, the variation of velocity with frequency is such that the first TM mode varies from a finite velocity, less than that of free space depending on the ratio of slot corrugations to separation of plates, at very low frequencies, to zero velocity at a higher frequency cut-off, where the slot depth is a quarter wavelength. This has the characteristics, therefore, of a low-pass filter. As the frequency is continuously increased, transmission takes place again, at very high velocities, decreasing to the free-space velocity for the frequency where the slot depth is one-half wavelength, and then decreasing to zero and another cut-off, at the frequency for which the slot depth is three-quarters of a wavelength. In this region it has the characteristics of a band-pass filter.

The second LEM mode varies similarly with frequency, except that it has a definite low frequency cut-off.

*(IV) Transmission within rectangular guide, with corrugated upper and lower walls. Longitudinal electromagnetic waves*

Figs. 10, 11, 10A and 11A show a corrugated rectangular guide 101 whose upper and lower walls $a$ are provided with corrugations 102, and whose side walls $b$ are smooth. Their propagational characteristics for the first and second LEM modes (Figs. 11 and 10) are similar to the case of the parallel sheets, except that there is superimposed on the latter's effects above described, an additional low frequency cut-off limitation, and a "speeding up" factor due to the width $a$. For rectangular corrugated guides whose widths $a$ are reasonably greater than a half wavelength, the characteristics are nearly the same as for the corrugated sheets, illustrated in Figs. 8 and 9. Figs. 10B, 10C, 11B, 11C show the amplitude characteristics of the field components.

Figure 10:
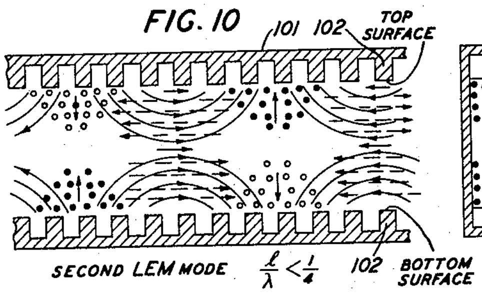
Figure 10A:
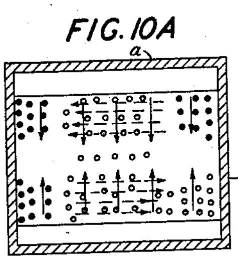
Figure 10B:
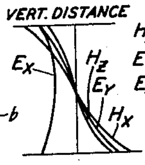
Figure 10C:
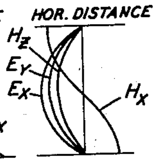

By letting the height $b$ of the rectangular guide become very large, the fields become approximately exponential functions of the distance from top to bottom surfaces 102 which means that for shallow slots the waves are confined near the corrugated surfaces 102. Also, such waves can likewise be guided by a rectangular trough with a corrugated bottom. The side walls of such a trough need not be perpendicular to the bottom, but may be at any angle, or even completely removed leaving a corrugated sheet of limited width. The velocity is different, but propagation is still possible under these conditions. Figs. 10A, 10B and 10C show the field distributions and the amplitude of the field components.

*(V) Transmission inside a corrugated circular cylinder transverse magnetic mode*

Fig. 12 shows a corrugated hollow circular cylinder 121 propagating a transverse magnetic mode TM along the interior thereof. The corrugations 122 are uniform circular rings concentric with the cylinder wall 121. They may be integral therewith, welded thereto or formed therein in any desired manner. The slot depth $$\frac{l}{\lambda}<\frac{1}{4}$$

whereas in Fig. 13

$$\frac{l}{\lambda}>\frac{1}{4}$$

For propagation through the interior of cylinders 121, Figs. 12 and 13, the velocity and impedance for the TM circularly symmetrical mode are dependent upon the diameter $d$ of the cylinder, as well as the slot depth $l$ and all waves have a definite low frequency cut-off. When the slot depth $l$ is less than a quarter wavelength, the velocity will vary from infinity at the cut-off diameter $d^{\infty}$ to a finite value slower than free-space velocity for very large diameters. Both the cut-off diameter for a given frequency, and the asymptotical velocity for large diameters is determined by the depth $l$ of the slots 123 in terms of wavelength.

Figure 12A:
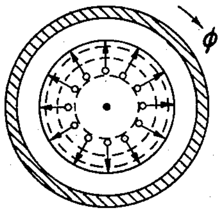
Figure 12B:
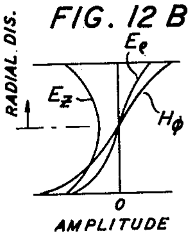
Figure 13A:
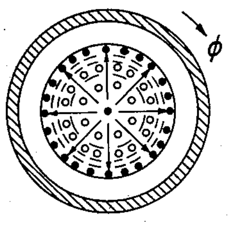
Figure 13B:
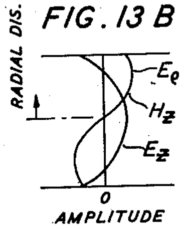

Figs. 12A and 12B show the field distributions and Figs. 13A and 13B show the field components variation with distance corresponding to the mode propagations illustrated in Figs. 12 and 13.

For slot depths between one-quarter and one-half wavelength, the velocity as a function of diameter is very similar to that for smooth circular wave guide, except that the cut-off diameter $d$ may have any value between that for the lowest circular electric mode in a circular pipe, and the lowest transverse magnetic mode in such pipe, depending upon the depth of slot. In fact for any depth of slot, there is a continuous variation of cut-off diameter, as a function of depth, from zero to any value. As the slot 123 increases in depth, the cut-off diameter for any mode decreases continuously until it reaches zero and disappears.

As a function of increasing frequency, the velocity varies from infinitely fast to zero and, after a band of no transmission, the velocity repeats the same cycle of variation. For small ratios of diameter to wavelength, there are stop bands between the first adjacent pass bands, but at higher frequencies and for larger diameters where more than one mode of transmission at a time becomes possible, the pass bands overlap.

Figure 14A:
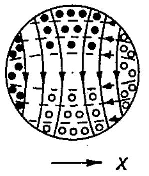
Figure 14B:
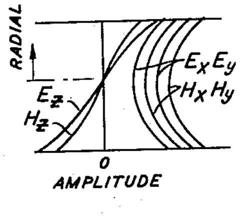

The longitudinal electromagnetic LEM mode is propagated interiorly through a corrugated circular cylinder as illustrated in Figs. 14, 14A and 14B. Here the velocity and impedance are rather complicated functions of the cylinder diameter near the cut-off, and for large diameters reduce to the general form for other corrugated surfaces.

This mode has a definite low cut-off limit where the cylinder circumference is one wavelength, below which it will not propagate regardless of sloth depth. For corrugated hollow cylinders smaller than one wavelength in circumference, the transverse magnetic mode becomes dominant and is the only one that will propagate.

Figs. 15, 16, and 17 disclose various modifications of constructional forms for a corrugated guiding surface.

Fig. 15 shows thin, parallel metal plates 152 embedded in slots in an extended conductive surface 151. The plates 152 are of uniform height $l$ and evenly spaced apart.

Fig. 16 shows a corrugated metal surface formed with sinusoidal undulations 161 uniformly spaced apart thereon, whereas Fig. 17 shows the corrugations as forming resonant cells or cavities 173 of like geometrical dimensions in an extended conductive surface 174.

Fig. 18 shows a trough-shaped conductive surface 181 provided with regularly spaced corrugations 182 and parallel side walls 183. The corrugations 182 are parallel and extend between the side walls 183.

(*VI*) *Signal transmission systems*

Figure 19:
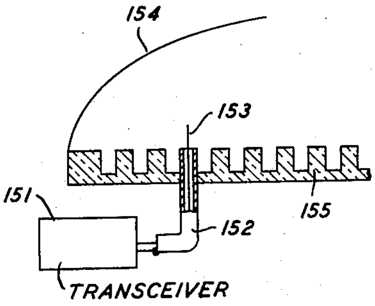

Fig. 19 shows a system in accordance with the invention for transmitting and receiving electromagnetic waves involving a single corrugated sheet or surface 155 of the type disclosed in Fig. 1. The transceiver 151 is a transmitter or receiver, or a combined transmitter-receiver of the general type known to the art, which is connected to a coaxial line 152, whose inner conductor terminates in a probe antenna or radiator 153. The coaxial line 152 passes through a dielectric rib or corrugation for rigid support and strength. The waves to be transmitted are reflected in proper reenforcing phase by parabolic reflector 154 and are then propagated along the corrugated surface 155 in the manner described in connection with Fig. 1. Incoming waves are received and similarly reenforced by the parabola and antenna 153 to be directed to the receiver 151 after traversing the coaxial line 152.

Figure 20:
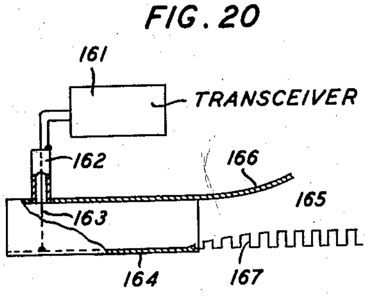
Figure 21:
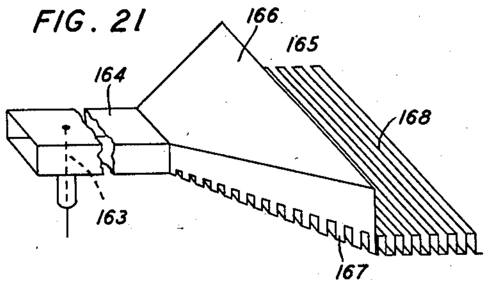

Figs. 20 and 21 are variants of the system of Fig. 19, wherein a probe antenna 163 radiates or receives signals inside a smooth hollow wave guide 164 of circular or rectangular cross section. A signal generated in transceiver 161 may be propagated into the wave guide 164, and be then converted without reflection by means of a tapered and corrugated horn 165. The horn 165, as shown in Figs. 20 and 21, has a tapering smooth surface 166 and an opposed corrugated surface 167, 168. Corrugations 167 increase in depth toward the free end of horn 165 for matching the impedance of the smooth guide 164 to the impedance of the horn. The corrugations 168 at the free end of the horn are uniform in depth and evenly spaced.

(*VII*) *Corrugated guide lens*

Since the velocity of propagation may be controlled by the depth of slot, a corrugated wave guide lends itself readily to the problem of focussing by radio lenses. Focussing may be accomplished with a single corrugated surface wave, or with waves between parallel plates by introducing a different relative delay for various parts of the wave, either by varying the depth, the spacing, or the width of corrugations. An example thereof is shown in Fig. 22.

Fig. 22 discloses a radio lens 221, wherein the corrugations 222 in the surface vary in spacing, width and/or depth to provide the same delay along any path from input 223 to output 224. The corrugations are made deep in the central region of this structure, and shallow near the edges, as per Fig. 22, so that the surface wave having the shortest path from the input to the output travels slowest, and that having the longest distance fastest. The corrugations are tapered in depth between these two situations, and the depth is controlled so that the electrical phase shift is the same along any wave path. The corrugations 222 are also curved so that they are nearly perpendicular to the direction of wave propagation at any point. This character of the propagating medium is such as to direct, or refract the waves toward the line of lowest velocity. Therefore the waves are initiated at the apex moving in all directions so that at the output the waves are in phase and directed parallel to the axis. Conversely, a uniphase wave, at the right-hand end of the structure, traveling to the left, would be focussed to a point at the apex.

Fig. 23 shows a two-way transmission system for multiplexed signals. A common conductive surface 231 is provided with corrugations on opposing faces, which may differ in spacing and depth, to favor guided transmission of the respective frequencies of signals A and B. Signal A is guided along the corrugations of the upper face into and out of the transceiver A. The piston P serves to reenforce the signal A. Correspondingly, the signal B is guided along the under face of the corrugated surface 231 and reenforced by piston P′ in its passage into or out of the transceiver B. Matching between the tapered horn H, and the smooth wave guides W, W′ is accomplished as in Fig. 21 by progressively tapering the depth of the corrugations on the opposing faces of surface 231. The corrugated free end 239 projects beyond the horn H and may be connected to any transmission system capable of transmitting the waves, such as corrugated guide 1 or ordinary wave guide system.

Fig. 24 shows a rectangular wave guide 241 partitioned by a corrugated sheet 245 into two separate wave guides 242, 243. Each of the corrugated rectangular guides 242, 243 has propagational characteristics similar in type to those previously described in connection with the rectangular corrugated guide of Fig. 10. The wave guides 242, 243 may be utilized in a multiplex, two-way communication system, such as illustrated in Fig. 23, in lieu of the pair of smooth wave guides W, W′ shown in Fig. 23.

Figure 25:
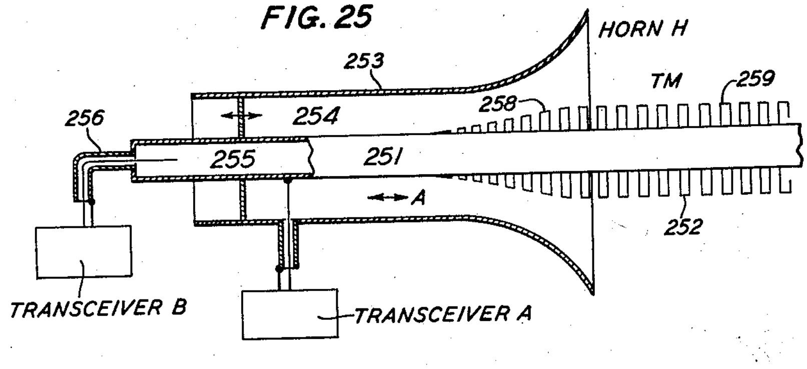

Fig. 25 shows a modification of the multiplexed two-way system of communications disclosed in Fig. 23. Multiplexing in Fig. 25 is by the simultaneous propagation over a coaxial line and through a hollow wave guide having an external corrugated surface. The external surface of the wave guide is part of the coaxial line.

For transmission, transceiver A generates and launches a signal A over a coaxial transmission line comprising conductors 251, 253. The signal A is reflected in reenforcing phase by movable piston 254. The outer surface of conductor 251, which is involved in the coaxial mode of transmission for signal A, is provided with tapering corrugations 258, which cooperate with the flare of horn H to provide a smooth transition in impedance from the coaxial line 251, 253 to the corrugated pipe antenna 259, which radiates the signal. Antenna 259 provides propagational characteristics analogous to those disclosed for the corrugated rod of Fig. 3. The mode of operation for reception of incoming signal waves from a distant station is reciprocal in character to that described for transmission.

For transmission, the transceiver B generates and launches electromagnetic signals B from a probe antenna 255 into the hollow interior of pipe 251 for conventional wave guide propagation therethrough. The probe 255, which is an extension of the inner conductor of coaxial line 256, lies along the principal axis of hollow guide 251.

Figs. 26 and 27 show radiating structures for transferring an electromagnetic wave from inside a wave guide to its exterior for propagation and guidance along a corrugated conductor integrally connected to the exterior of the wave guide. In Fig. 26 the wave is transferred from a dominant $TE_{10}$ mode in the rectangular guide 261 through coupling slots 264 to a mode appropriate to the corrugated guide 266 situated on the exterior of the guide 261. This mode has the same propagation velocity as an external wave on the corrugated surface 265, and therefore excites such a wave by coupling through slots 264. This phenomenon may be used to transfer all of the wave energy from inside the rectangular guide 261 to the external wave on corrugated surface 265 by using a suitable length of transition guide 267.

Fig. 27 shows a similar transfer structure for converting from internal to external transmission or reception along a cylinder 273 corrugated interiorly and exteriorly.

For transmission, a source 270 generates a wave for propagation through a smooth cylindrical pipe 271. A converter section 272 transforms to wave propagation characteristic of hollow corrugated guide 273, which is provided with regular corrugations 277 and a wave barrier 278 at its terminal end. The corrugated guide 273 is provided with external corrugations 275 and coupling slots 274 located on the opposite side from internal corrugations 277. The internal wave propagating through pipe 273 is coupled through slots 274 to the external surface, and is thence guided by exterior corrugations 275 and 276.

Fig. 28 shows a coaxial transmission line wherein the inner conductor 281 terminates in a corrugated rod 284, and the outer conductor 282 is flared outwardly. The corrugated tapering portion 283 near the throat of the flare serves to provide a smooth impedance transition between line sections 281 and 284.

Fig. 29 shows a coaxial line similar in structure to that of Fig. 28, with the flaring horn 285 omitted, and with the inner conductor 291 tapering to a small diameter. The tapering corrugations 293 provide for smooth electrical transition between conductor 291 and corrugated rod 294.

Fig. 30 shows the transition to a LEM mode on a corrugated rod from other types of smooth wave guides and their respective modes, and conversely.

A $TE_{11}$ wave in a circular pipe or $TE_{10}$ in rectangular pipe is launched at 305 and transmitted through smooth guide 306 which may be either rectangular or round in cross section. These modes are transformed into the LEM mode on corrugated rod 309 via a coaxial mode over coaxial line 302, 303. Impedance smoothing transitions are provided at 302 and 308. The corrugated rod 309 may be used as a transmission system or may be connected to other means of transmission or radiation.

Fig. 31 shows a converter from a coaxial mode of transmission to a mode of transmission characteristic of the corrugated rods disclosed in Fig. 3.

A source of oscillations 311 is connected to coaxial line 312, whose outer conductor 313 has uniformly spaced annular corrugations 314 on its exterior surface. Circumferential slits or openings 315, situated between successive corrugations 314 and a reflecting piston 316 permit the exit of electromagnetic waves from the interior of the coaxial system to its exterior, where the waves are converted into a mode characteristic of the corrugated rod, previously disclosed in connection with Fig. 3. The corrugations 314 extending along the outside surface of conductor 313 then guide the external waves in the characteristic manner of corrugated rod propagation.

The details of the arrangement of slits 315 for TM waves are shown in Fig. 32 while Fig. 33 shows a different arrangement of slits 335 for providing LEM waves. The location of slits 335 in Fig. 33 are shown as colinear along the direction of the maximum field vertor E. The slits in both figures are cut only at points where the relative phases of the waves inside and outside of the guide are the same. In the case of Fig. 32 four slots are cut at each circular section; but in Fig. 33 the alternating slits are at top or bottom of the guide as the case requires, with the axis of the individual slits 335 transverse to the vector E.

Fig. 34 shows a wave guide transmission system for modulated waves, wherein a conversion is effected from conventional wave guide transmission to a form characteristic of corrugated hollow pipes. The source 341, which may be a generator of microwaves such as a reflex klystron, is modulated by speech waves from the microphone 342 to provide modulated waves which are launched by the axial probe antenna 344 into the hollow interior of cylindrical wave guide 345. The antenna 344, which is an extension of the inner conductor 343 of a coaxial transmission line, effectively converts from a coaxial mode of transmission to a TM wave guide mode. Corrugated hollow pipe wave converter 346, which is integrally or otherwise fixedly interposed in the smooth wave guide 345, provides the transition from conventional TM wave guide propagation to a TM mode characteristic of hollow corrugated pipe. Other modes such as $TE_{11}$ which may be excited are reflected at 346 and only the pure TM mode is transmitted. The terminals 347 of the corrugated pipe 346 have suitably tapered corrugations to effect a smooth transition whereby freedom from undesired wave reflections is achieved.

Fig. 35 is a prolongation of the system of Fig. 34, with further provision for internal and external propagation of modes characteristic of hollow corrugated pipes. For this purpose, the smooth wave guide pipe 345 is extended for a suitable distance, and its prolongation 345 in Fig. 35 is then provided with external annular corrugations 314 and circumferential slits 315 as heretofore described for Fig. 31. Thus, in the region of converter section 351 on the left, an internal and external wave of the corrugated pipe type will be established and will propagate to the right of Fig. 35 inside and/or outside of flexible corrugated pipe 355. Reflecting barriers 316 may be used if only external transmission over the flexible section 355 is desired.

At matching section 352, tapered corrugations 353 are provided designed to smoothly match the thin, flexible corrugated wave guide section 355 to the section 351. The corrugated wave guide 355 may be a sylphon bellows type with the advantage of having no discontinuities arising from metal-to-metal contacts and the jointing of ordinary flexible wave guide. In the transmission line of Fig. 35, the flexible section 355 may be provided with a smaller diameter than normal, without cutting off the normal propagation of desired modes and at the same time suppressing undesired higher order modes.

Transmission on the outside of the flexible section 355 has also the advantage of smaller size, since the external wave is transmitted efficiently when the overall diameter of section 355 is no greater than one-quarter wavelength. Reception of signaling waves may be accomplished by appropriate changes in the structure of Fig. 35.

Fig. 36 shows a modification of the two-way multiplex communication system disclosed in Fig. 23, wherein the corrugated plate 231 is replaced by a radiator 361, having a series of parallel equispaced rectangular conductive plates 362 embedded in a dielectric rod 363 of low-loss dielectric material, such as rubber polystyrene, titanium dioxide, barium titanate or the like. The dielectric material may have a high dielectric constant or it may have substantially the dielectric constant of air, viz., unity. The transceivers A, B and the horn are as described in Fig. 23.

Fig. 37 shows a modified form of wave guide, wherein a series of parallel equispaced metallic flat rectangular plates 372 are mounted between flat metallic longitudinal bars 371 to form a ladder-like structure consisting of similar cells 373. Each of cells 373 comprises a pair of adjacent parallel plates 372 and the connecting end bar sections 371 with the intervening dielectric medium, which may be air or any other suitable dielectric, fluid or solid.

Fig. 38 shows a wave guide comprising a hollow cylindrical pipe 381 formed of low-loss dielectric material, as described with reference to Fig. 36, in which a series of parallel, equispaced annular conductive plates 382 are embedded. In general, the spacing, thickness and dimensioning of the plates may be as in Figs. 4 and 5.

The propagational characteristics of the loaded wave guides shown in Figs. 36 and 38 are dependent on the ratio of plate spacing to the wavelength in a manner analogous to that defined for the corrugated rod and pipe aforementioned.

*(VIII) Phase shifter and delay transmission line*

Since the velocity of transmission in or on guides with corrugations less than one-quarter wavelength deep, is slower than in conventional guides, and may be made very slow, such corrugated guides may be arranged to give time delays of predetermined fixed or variable value.

The corrugated surface may be used as a phase shifter, to give a wide variation of phase in a short length in several ways. First, the slot depth in a corrugated guide may be varied by pistons, or tuning screws, to vary the phase velocity. Second, if a sylphon bellows be used to conduct the waves, the phase may be varied by stretching and compressing the length of sylphon bellows guide. Third, the phase may be varied in a rectangular corrugated guide by varying the height of the guide. Since a slow traveling wave may be used, any of the above methods may be made to give a greater phase variation in a given length than could be obtained in conventional wave guides.

Fig. 39 shows a conventional wave guide transmission line with interposed sections of corrugated wave guide 392 adapted to provide phase shifts of predetermined amount in the transmission of waves through the long wave guide pipe 391. An advantage of the corrugated phase shift section 392 is that short lengths are adequate to provide appreciable amounts of delay or phase shift, which may be easily varied in amount for example, by utilizing an expansible sylphon bellows construction as the corrugated guide 392. It should, however, be understood that predetermined or fixed amounts of delay or phase shift are also envisaged for the corrugated form of phase shifter.

Fig. 40 discloses a variable phase shifter utilizing a section of hollow corrugated pipe. A section of hollow corrugated pipe 401 is interposed in a smooth wave guide line 402; for example, a cylindrical or rectangular pipe. One internal face 403 of pipe 401 is provided with regularly spaced corrugations 404, succeeded by shallower corrugations 406, 407 which taper in depth towards the ends of section 401 for the purpose of impedance matching to the smooth wave guide 402. Opposite the corrugated face 403, a longitudinal spring face member 408 is provided, which may be bowed inwardly or outwardly by handle 405 to vary the cross-sectional dimensions, thereby variably altering the phase velocity of the propagated waves and providing variable phase shifts.

Fig. 41 discloses a corrugated sheet, wherein the depth of the corrugations may be varied at will by ganged control. The sheet 411 is provided with a series of regularly spaced slots 412 spaced apart $$\frac{\lambda^{\circ}}{8}$$

or less. The length $l$ of the slot may be one-half wavelength or more. Associated with each slot 412 are chambers forming corrugations 413 integral with the corrugated sheet 411. The depth associated with each corrugation 411 or the controllable length of chambers 413 is determined by the ganged pistons 414, which are displaceable into and out of the chambers by the movement of the common fastening plate 415 and handle 416.

Fig. 42 shows a corrugated type of mode converter for transforming from a dominant $TM_{01}$ coaxial mode to a wave guide $TM_{01}$ mode for propagation in smooth hollow pipe.

The corrugated mode converter section 421 is connected integrally or by mechanical coupling between a coaxial line 422 and a hollow wave guide cylinder 423. The coaxial line 422 has connected thereto generators or transducer structure (not shown) for propagating a $TM_{01}$ coaxial mode toward the right. The converter 421, which supports a TM mode as heretofore described in connection with Figs. 12 and 13, is flared out in cross section to connect onto hollow cylinder 423, which may be designed to support a $TM_{01}$, $TM_{02}$ mode etc.

The depth of the corrugations 424 may be uniform along section 421, until it approaches pipe 423, whereupon the depth of corrugation may taper as shown for accomplishing a smooth, reflectionless transition in impedance into pipe 423.

Fig. 43 discloses a frequency filter. The hollow pipe 431 has a longitudinal corrugated sheet 432 dividing it into two sections. The width of the corrugations 433 on the upper face is different, i.e., greater than the width of the corrugations 434 on the lower face of the sheet, but the depth of corrugation is otherwise uniform. The length of the sheet 432 is such that $f_1$ passes through the upper and lower sections of pipe in time intervals such as to appear in the output in phase opposition, whereby $f_1$ is eliminated but $f_2$ is passed therebeyond to a useful load (not shown). The electrical length of the upper and lower corrugated faces may be represented as L and $$L\pm\frac{\lambda_1}{2}$$

respectively. The corrugated ends of the sheet 432 are tapered for matching impedances.

Figure 11:
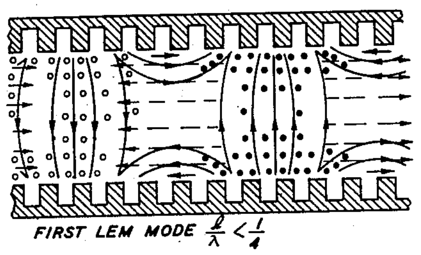
Figure 11A:
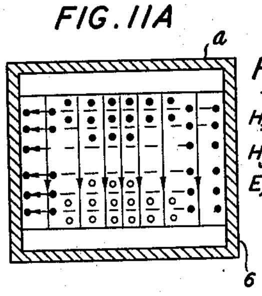
Figure 11B:
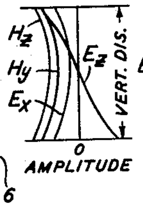
Figure 11C:
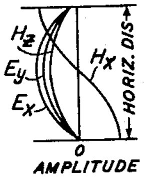

Fig. 44 shows a standing wave detector arrangement utilizing corrugated wave guide for improved operation. The pipe 441 has conventional rectangular wave guide end sections 442, and an integral intermediate corrugated wave guide section 443 of rectangular type (Figs. 10A and 11A). The regularly spaced corrugations 444, which merge with impedance matching tapered corrugations 445, serve to concentrate the propagated wave energy passing through pipe 441 in close proximity thereto and permit the opening of the top of said pipe 441 without appreciable radiation of energy therefrom. The inclined flaps 446 in the opening 447 act to match the impedance of pipe 441 to outside space at the opening, whereas the tapered corrugations 445 match the corrugated section 443 to the end rectangular sections 442. A sliding member 448 bridges the opening 447 and carries the moving retractable probe 449, coaxial conductor, measuring crystal and ammeter arrangement 450.

The reduction of possible radition from the open top 447 constitutes a desirable improvement over the slotted type of carriage arrangement in the conventional standing wave detectors of the prior art.

Fig. 45 shows a wave meter arrangement suitable for use in connection with corrugated guides and/or smooth wave guides.

A hollow cylindrical wave guide 451, through which circularly symmetric waves propagate, has attached thereto a wavemeter 452, comprising a hollow corrugated pipe 453 with regularly spaced corrugations 454 therein and a coupling apertured end plate 459. A reflecting piston 455 at the end of pipe 453 opposite to end plate 459, is associated with a detecting crystal 456, coaxial conductor 457 and ammeter 458 for indicating cavity resonance in the wave meter 452. The piston 455 has quarter wavelength traps 459' in its sides to prevent leakage past it into the space rearward thereof.

The advantages of the wave meter arrangement (Fig. 45) are to provide a wider band spread for frequency measurements by the use of smaller diameter and lengths in the wave meter. A large change in piston position corresponds to a small interval of frequencies, thereby providing greater sensitivity and precision in frequency measurement. This improvement is attributable to the decreased velocity of waves in the corrugated hollow pipe 453.

Fig. 46 shows a reflecting piston 461 on a solid corrugated rod 462 having ring corrugations 464. The piston 461 is provided with internal, wave leakage preventive traps 463.

Fig. 47 shows a corrugated wave guide system for transmitting and receiving modulated signal waves.

A signal transceiver 471, well known in the radar art and microwave radio relay field, is connected to a modulator 472 whose function is to combine the local oscillations from source 473 either with the incoming received signal or with the transmitted signal in a conventional manner.

In the case of transmission, a modulated microwave is sent over coaxial line 474 for ultimate propagation through a corrugated wave guide system 475. The terminal probe 476 launches the modulated signal in the form of circular magnetic waves in a section of smooth pipe 478. These waves comprise a $TM_{01}$ mode and others. To obtain a pure $TM_{01}$ mode for transmission over the corrugated wave guide 475, a mode filter 477 is connected between a first section of smooth pipe 478 and a second section of smooth pipe 478. The mode discriminating filter 477 comprises a section of corrugated pipe of diameter less than approximately .32 wavelength, which is below cut-off for all other modes, so that the TM mode is truly dominant. The internal corrugations 479 of section 477 are tapered and made shallower at both ends thereof and the section diameter is concomitantly enlarged to smoothly connect into the pipes 478. A purified wave in the $TM_{01}$ mode is thereby obtained at the outputs of filter 477 and right-hand section of pipes 478.

The operation of corrugated section 477 as a transmission mode discriminating filter is explained thereby. Since a smooth circular guide 478, as shown at the left of Fig. 47, transmits the $TM_{01}$ wave and is necessarily large enough to also pass a $TE_{10}$ wave, it is important to be able to filter out the undesired $TE_{10}$ component. Other methods of stopping the $TE_{10}$ mode by resonant filters have the disadvantage that they are relatively sharp in band width and give a limited amount of protection. When the corrugated pipe filter 477 of Fig. 47 has the right proportions for rendering the transverse magnetic mode dominant, it will not transmit the $TE_{10}$ wave, and any amount of attenuation to the transverse electric mode $TE_{10}$ may be introduced, depending only on the length of corrugated section.

(*IX*) *Antenna arrays*

If a small discontinuity is present in the corrugated surface, there will be radiation at that point. A number of such discontinuities constitute a radiating array. The amplitude of the radiation from any point is determined by the size of discontinuity, and the phase by its position.

Thus, in Fig. 48 the corrugated rod 481 has regular discontinuities or enlargements 482 spaced apart a wavelength, which cause radiation and constitute a broadside array, with directivity perpendicular to its length, but non-directional in a plane perpendicular to it. If the phase velocity were made small, one protuberance 482 per wavelength would be sufficient, but if desired, the nature of the discontinuity could be reversed every half wavelength as at 483, where the corrugation is shallower, and twice the number of discontinuities obtained. The shallower discs or rings 483 constitute impedances of opposite sign to the impedance of the enlarged discs 482. The angle of the essentially conical beam of such an array from a plane could be varied by changing the phasing of the discontinuity elements. The plane of polarization of the radiation would normally be parallel to the rod 484, but could be altered depending upon the nature of the discontinuity.

In Figs. 49 and 49A, a number of discontinuities in the form of posts 491 are made to protrude from the rod 490 at close intervals, spiraling along it with a pitch of one wavelength. These may then be so phased that only horizontally polarized waves would be excited.

Fig. 50 shows a plane array using a corrugated sheet 500 excited from a line source, such as a reflecting sectoral parabola 501, and a coaxial probe antenna 503. The parabola 501 is fastened to the sheet at one edge 504. Discontinuities in the corrugations 502 may be made to produce the radiation, and the pattern may be controlled by varying the position and size of the corrugated discontinuities to give a desired shape such as a pencil beam, or a cosecant squared pattern. Its advantage over other radiators is that it would be easier to make and hold a flat corrugated surface than a curved surface such as other microwave antennas require.

By decreasing the depth of corrugations continuously along the length of the externally corrugated guide 500 (or its equivalent, the corrugated rod) an end-fire radiator similar to the polyrod can be obtained. The wave on a corrugated surface 500 with corrugations one-eighth wavelength or so deep is closely confined to the surface, but as the corrugations 502 are made more shallow, the field extends further from the surface and the wave goes faster, approaching the free-space velocity. When the depth becomes very small, the wave approximates a plane wave. This amounts to a continuous transformation from a guided wave along a corrugated surface to a free plane wave.

(*X*) *Microwave generators*

The corrugated surface also may be utilized in microwave generators of velocity variation type, as illustrated in Fig. 51A. Here an electron beam 510 is focussed and bunched by focussing cylinder 511 and bunching electrodes 512, and transmitted through a cylindrical corrugated guide 513 of the type illustrated in Figs. 12 and 12A. If the beam 510 has the same velocity as the electromagnetic wave propagation, there will be a continuous exchange of energy from the beam to the wave, as it progresses down the corrugated cylinder 513. The beam can finally be absorbed in the walls 514 of the corrugated guide, which may be continued outside of the vacuum tube to conduct the energy to the load. Alternatively, the output wave may be propagated over a conventional wave guide or microwave radio relay link. This method of exciting the wave directly in the corrugated guide by the beam of moving electrons is made possible by the fact that the traveling wave can be made to go as slowly as desired, so that a practical beam velocity may be used. Since the electron beam travels continuously in the outward direction, only the outward wave is excited and no termination at the beginning of the corrugated guide is necessary.

Fig. 51B shows a similar application of the corrugated surface to a radially swept electron beam tube of the type disclosed in the United States Patent 2,408,437, issued October 1, 1946, to J. W. McRae, and in United States Patent 2,381,539, issued August 7, 1945, to R. V. L. Hartley.

Referring to Fig. 51B, which shows a harmonic generating electron beam tube 519, the externally corrugated circular guide or ring-shaped trough 520 corresponds to the ring-shaped guide or cavity of the aforementioned McRae and Hartley patents. The corrugations 521 are regularly arranged and radially disposed like spokes of a wheel between the circumferential rings 522, 523. Radial coupling slits 524 are provided between adjacent corrugations and at the base of the trough 520 for wave energy transfer to a rectangular corrugated guide 525 having an arcuate trough 526 with radially disposed corrugations 527 and coupling slits 528 for matching and coupling with corresponding elements of the trough 520. The arcuate trough 526 is similar in structure to the ring 520.

The electron gun and beam rotating or deflecting electrodes in Fig. 51B are of the type disclosed in the aforementioned McRae and Hartley patents. A signal transceiver 530 is connected to a modulating grid 531 of the electron beam tube 519.

The beam of electrons is rotated with a writing or angular velocity to match the electromagnetic wave propagated around the closed annulus of the ring-like trough 520 to provide for a mutual exchange of energy between the electrons and waves. The waves are then coupled from the annular trough 520 into the corrugated guide 525 by coupling slits 524, 528 as shown, or by means of loops or dipole probes, not shown. The tube of Fig. 51B has the advantage that the electron beam may be continuously excited without requiring so large a writing velocity, and accurate focussing into a narrow slit as in the prior art tubes. The beam dimensions may be as large as one-half a wavelength or so, radially, and of the order of one-quarter wavelength along the circumference of the sweep. The extent of the field above the corrugated surface is not great (about $.1\lambda$ for $\frac{1}{8}\lambda$ deep plate), so that excessive beam velocities would not be necessary.

Fig. 51C shows a traveling wave tube utilizing corrugated pipe modes of wave propagation.

Traveling wave tube 540 is of the general type disclosed in the United States patent application Serial No. 640,597, filed January 11, 1946, by J. R. Pierce, now United States Patent 2,636,948, issued April 28, 1953. The heated filament 541, accelerating grid 542 and focussing cylinder 543 form the emitted electrons into an electron beam, which interacts in energy exchange with electromagnetic waves propagating from the corrugated guide input 544 into the main wave guide. The regularly spaced corrugations 545 function to reduce the velocity of input wave to the point where it and the electron beam velocity along the principal axis of wave guide 540 are substantially equal. Interaction or exchange of energy between the moving electrons and the traveling wave occurs in a manner to provide an amplified electromagnetic wave derived at the output corrugated guide 546. The amplified output wave may then be transmitted to a useful load by conventional or corrugated wave guide or by radio relay link methods. The timing pistons 547, 548 and electron collector 549 are like those as disclosed in the aforementioned application Serial No. 640,597, filed January 11, 1946, by J. R. Pierce.

It should be understood that the corrugated guide also has properties which make it useful as a frequency discriminating filter, either high-pass, low-pass, band-pass or band-stopping. As such it has advantages in that it is possible to connect smoothly into the filter with no critical irises, etc.

It should be understood that in the various forms of corrugated surfaces heretofore disclosed, provision may be made for filling the corrugations with dielectric material wholly or partially to permit the use of shallower corrugations without thereby departing from the spirit of the invention.

It should be understood that the corrugated hollow pipes may likewise be filled with a fluid or solid dielectric without departing from the spirit of the invention.

What is claimed is:

1. An antenna comprising means for launching a wave from a given point and a corrugated surface extending from said point for guiding said wave, said surface having corrugations which are everywhere substantially normal to the radii extending from said given point to points on a straight line removed from said given point, at least one cross sectional dimension of each corrugation differing from the corresponding dimension of other corrugations at least along some of the radii interconnecting said given point and points on said straight line to equalize the phase delay of waves propagated along said radii.

2. An antenna comprising means for launching a wave from a given point and a corrugated surface extending from said point for guiding said wave, said surface having corrugations which are spaced apart and are curved substantially about said given point to be everywhere substantially normal to the direction of wave propagation from said given point to points on a straight line removed from said given point, the depth of said corrugations being varied along the curved direction to equalize the phase delay along any radius interconnecting said given point and a point on said straight line.

References Cited in the file of this patent

UNITED STATES PATENTS

| | | |
|---|---|---|
| 2,388,906 | Corderman | Nov. 13, 1945 |
| 2,422,184 | Cutler | June 17, 1947 |
| 2,432,093 | Fox | Dec. 7, 1947 |
| 2,438,119 | Fox | Mar. 23, 1948 |
| 2,453,414 | De Vore | Nov. 9, 1948 |
| 2,460,090 | Kannenberg | Jan. 25, 1949 |
| 2,474,137 | Young | June 21, 1949 |
| 2,567,748 | White | Sept. 11, 1951 |
| 2,623,121 | Loveridge | Dec. 23, 1952 |
| 2,659,054 | Alford | Nov. 10, 1953 |

OTHER REFERENCES

"Wave Guides," by L. G. H. Huxley, 1947, MacMillan Co., pages 198–203.